US012659498B2

(12) United States Patent
Chen et al.

(10) Patent No.:  US 12,659,498 B2
(45) Date of Patent:    Jun. 16, 2026

(54) ROLLING BUFFER FOR RETROACTIVE CAPTURE OF CLIPS

(71) Applicant: Discord Inc., San Francisco, CA (US)

(72) Inventors: Chao Chen, Mountain View, CA (US); Benjamin Morse, San Francisco, CA (US)

(73) Assignee: DISCORD INC., San Francisco, CA (US)

( * ) Notice: Subject to any disclaimer, the term of this patent is extended or adjusted under 35 U.S.C. 154(b) by 46 days.

(21) Appl. No.: 18/500,777

(22) Filed: Nov. 2, 2023

(65) Prior Publication Data

US 2024/0380906 A1      Nov. 14, 2024

Related U.S. Application Data

(60) Provisional application No. 63/465,242, filed on May 9, 2023.

(51) Int. Cl.
*H04N 19/42*          (2014.01)
*G06V 20/40*          (2022.01)
*H04N 19/115*        (2014.01)
*H04N 19/15*          (2014.01)

(52) U.S. Cl.
CPC ............. *H04N 19/42* (2014.11); *G06V 20/46* (2022.01); *H04N 19/115* (2014.11); *H04N 19/15* (2014.11)

(58) Field of Classification Search
CPC ...... H04N 19/42; H04N 19/115; H04N 19/15; G06V 20/46
See application file for complete search history.

(56) References Cited

U.S. PATENT DOCUMENTS

| | | | |
|---|---|---|---|
| 10,721,517 B2 * | 7/2020 | Wu .......................... | H04N 5/76 |
| 2006/0129909 A1 * | 6/2006 | Butt .................. | G11B 27/3027 |
| | | | 348/E7.071 |
| 2008/0145020 A1 * | 6/2008 | Tsuruga ......... | H04N 21/234318 |
| | | | 386/326 |
| 2014/0126651 A1 * | 5/2014 | Erickson ................ | H04N 19/44 |
| | | | 375/240.25 |
| 2018/0293965 A1 * | 10/2018 | Vembu ................ | G06F 9/45533 |

FOREIGN PATENT DOCUMENTS

| | | | |
|---|---|---|---|
| CN | 115426501 A | * | 12/2022 |
| CN | 116074520 A | * | 5/2023 |

* cited by examiner

*Primary Examiner* — Tracy Y. Li
(74) *Attorney, Agent, or Firm* — POLSINELLI PC // (DC OFFICE)

(57)          ABSTRACT

The disclosed technology addresses the need in the art for to facilitate user accounts participating in live audio-video sessions such as voice and/or video calls, or watching game play remotely to capture a clip of the video call or game play after seeing some event during the live audio-video session. The present technology can maintain a rolling buffer of the audio-video streams such that a user account can retroactively capture a clip of the audio-video streams after it has already been presented.

20 Claims, 13 Drawing Sheets

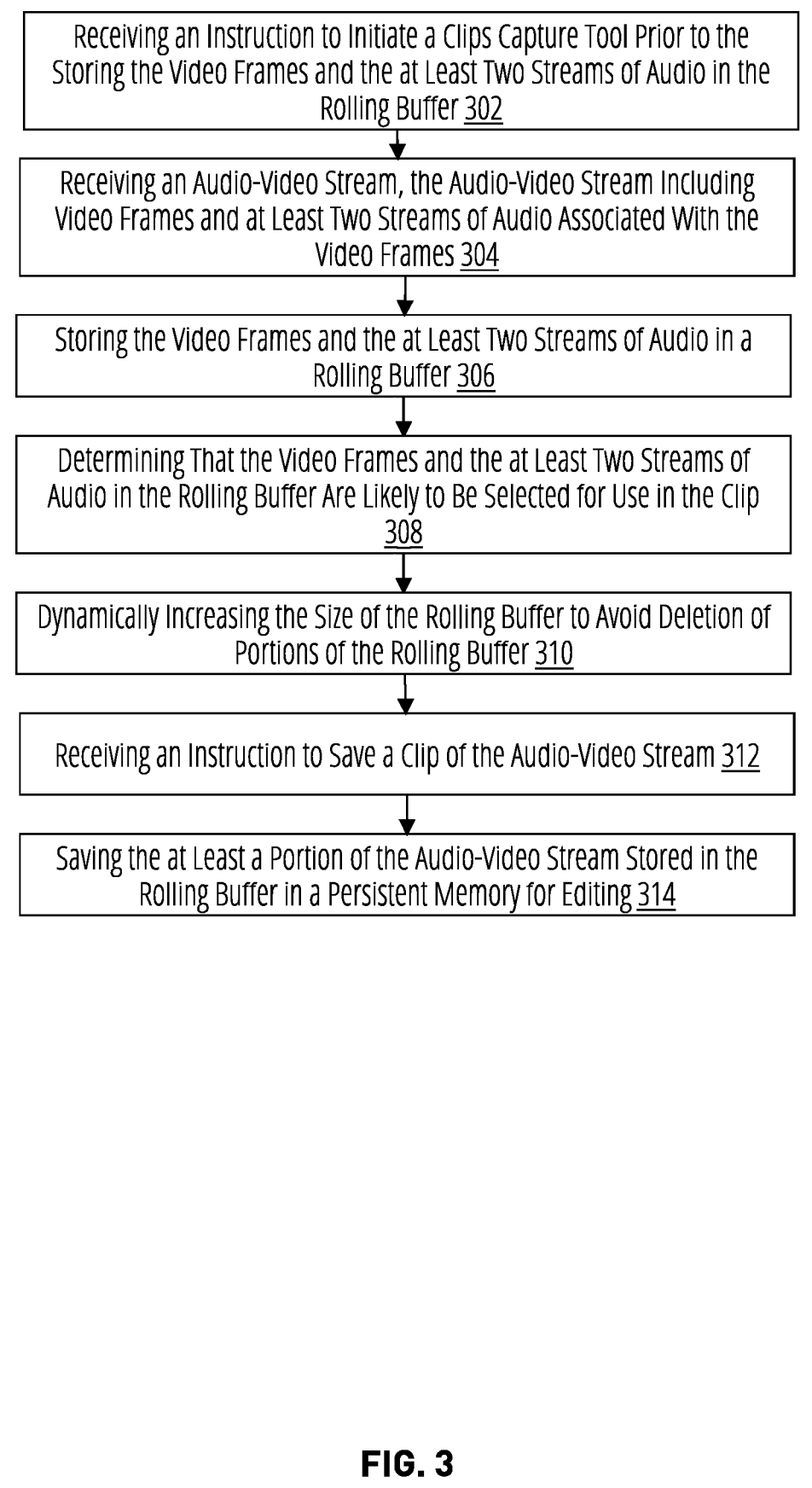

Receiving an Instruction to Initiate a Clips Capture Tool Prior to the Storing the Video Frames and the at Least Two Streams of Audio in the Rolling Buffer 302

Receiving an Audio-Video Stream, the Audio-Video Stream Including Video Frames and at Least Two Streams of Audio Associated With the Video Frames 304

Storing the Video Frames and the at Least Two Streams of Audio in a Rolling Buffer 306

Determining That the Video Frames and the at Least Two Streams of Audio in the Rolling Buffer Are Likely to Be Selected for Use in the Clip 308

Dynamically Increasing the Size of the Rolling Buffer to Avoid Deletion of Portions of the Rolling Buffer 310

Receiving an Instruction to Save a Clip of the Audio-Video Stream 312

Saving the at Least a Portion of the Audio-Video Stream Stored in the Rolling Buffer in a Persistent Memory for Editing 314

FIG. 3

Providing an Interface to Edit the Video Frames and at Least Two Streams of Audio From the Portion of the Audio-Video Stream Stored in the Persistent Memory 402

Receiving a Selection of a First Audio Stream of the at Least Two Streams of Audio for Editing 404

Encoding the Edited Clip 406

602

604

210

ROLLING BUFFER FOR RETROACTIVE CAPTURE OF CLIPS

CROSS-REFERENCE TO RELATED APPLICATIONS

This application claims priority to U.S. provisional application No. 63/465,242, filed on May 9, 2023, which is expressly incorporated by reference herein in its entirety.

BACKGROUND

When user accounts participate in live audio-video sessions such as voice and/or video calls, live streams of game play or other content, or watch game play remotely, it can sometimes occur that a user desires to have a clip of the audio-video session or game play after seeing some event during the live audio-video session.

BRIEF DESCRIPTION OF THE SEVERAL VIEWS OF THE DRAWINGS

Details of one or more aspects of the subject matter described in this disclosure are set forth in the accompanying drawings and the description below. However, the accompanying drawings illustrate only some aspects of this disclosure and are therefore not to be considered limiting of its scope. Other features, aspects, and advantages will become apparent from the description, the drawings and the claims.

FIG. 3 illustrates an example method for retroactively capturing a clip, editing the clip, and encoding the clip in accordance with some aspects of the present technology.

DETAILED DESCRIPTION

Figure 1:
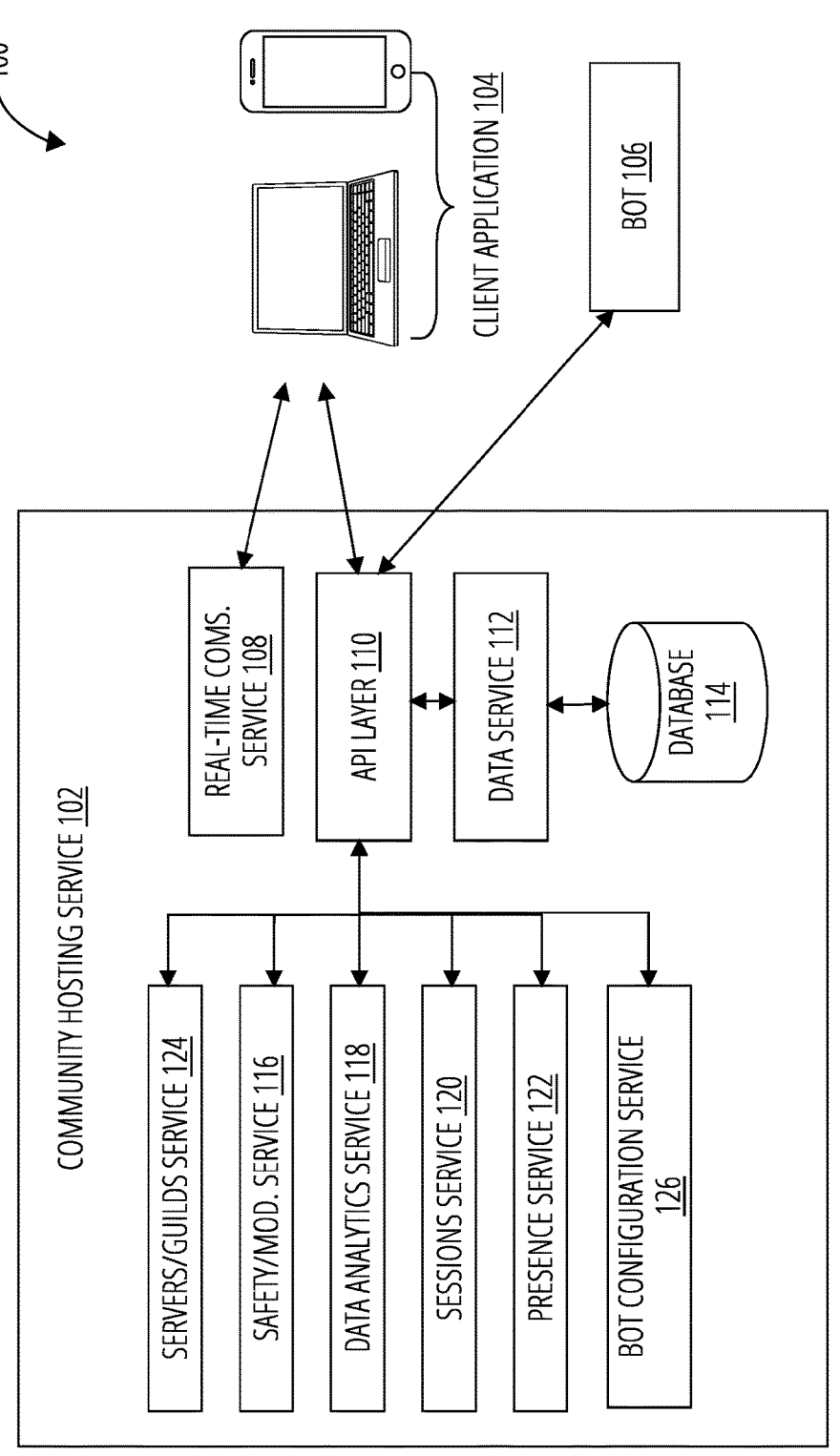
FIG. 1 illustrates an example system that is configured to support user accounts in creating, managing, and participating in online communities in accordance with some aspects of the present technology.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The disclosed technology addresses the need in the art to facilitate user accounts participating in live audio-video sessions such as voice and/or video calls, streaming game play or other content, or watching game play remotely to capture a clip of the video call or game play after some event during the live audio-video session. The present technology can maintain a rolling buffer of audio-video streams such that a user account can retroactively capture a clip of the audio-video streams after it has already been presented.

While some existing technologies can store audio and video, they are not suitable for the present technology. The present technology requires both the real-time capture of audio and video, and editing of the audio and video including the associated metadata. Other audio-video recording solutions require a delay of the creation of the clip for many seconds, whereas the present technology can quickly create the clip even as additional audio and video data are stored in the rolling buffer. And existing solutions make it difficult to edit the clips from the encoded audio and video stored in a rolling buffer.

In addition, the present technology can enable a user account to edit the video frames and the audio streams that make up the audio-video streams before encoding the edited clip and saving or sharing the clip. In some embodiments, the audio-video streams can include multiple streams of video frames and multiple streams of audio. The multiple streams of video frames and audio streams can be separately edited, muted, removed from the clip, etc. In some embodiments, the multiple streams of audio can be saved independently-one track per recorded participant—of each other and independently of the video. Saving independent audio and video streams can provide greater flexibility in editing the clips to the user. For example, individual user tracks can be muted and unmuted, or deleted from a clip.

In addition, the present technology can also provide video encoding that is optimized to a client device. The client application can determine the video encoding capabilities, the type of graphical processing units, the software codecs available to the client device and optimize video encoding to the capabilities of the client device and user's desire for the quality of the clips video. This can be especially useful since streaming and playback of the audio-video streams can consume significant memory and processor resources, and video encoding can also consume significant memory and processor resources, and these processes might occur at the same time. Accordingly, any efficiency, such as optimizing a video encoding process for a client device can be helpful.

As described herein, one aspect of the present technology is the gathering and use of data available from various sources to improve the delivery of services in support of communities. The present disclosure contemplates that in some instances, this gathered data may include personal information data that uniquely identifies or can be used to contact or locate a specific person. Such personal information data can include demographic data, location-based data, telephone numbers, email addresses, ID's, home addresses, data or records relating to a user's health or level of fitness (e.g., vital signs measurements, medication information, exercise information), date of birth, or any other identifying or personal information. The present disclosure recognizes that the use of such personal information data, in the present technology, can be used to the benefit of users.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes.

Although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

FIG. 1 illustrates an example system 100 configured to support user accounts in creating, managing and participating in online communities. In particular, the system 100 supports a plurality of user accounts interacting with each other in communities to which they belong.

The system 100 illustrates an example architecture in which users of user accounts interact through an instance of client application 104 operating on a computing device. The client application 104 can be provided by a webpage rendered in a web browser or a downloaded client application executed by an operating system of the computing device. In some embodiments, some disparate collections of features or functionality might be available in client application 104 depending on the capabilities of the environment executing or rendering the client application 104.

The system 100 also includes a community hosting service 102, which provides an infrastructure for supporting the plurality of user accounts interacting with each other in communities to which they belong. The community hosting service 102 can be a distributed service hosted in a cloud computing architecture. The community hosting service 102 is responsible for hosting various services accessible to the user accounts by the client application 104.

In some embodiments, the community hosting service 102 provides a servers/guilds service 124 to enable user accounts to set up a server (also referred to as a guild) to host members interacting around one or more channels. A server (or guild) is a user-created environment supporting a community. A server is generally configured with one or more channels which are generally created around topics or sub-topics, or groups of people, and can support exchanges of communications between user accounts. Some channels are non-real-time channels where users communicate through written messages, images, emojis, recorded voice or video files, attachments, etc. Some channels are real-time communications channels that support voice or video communications. Some channels may be able to support both non-real-time messaging and real-time communications.

A user account can operate their instance of the client application 104 to create a server at the community hosting service 102. In some embodiments, this will be performed by the client application 104 calling the API layer 110 requesting to create a new server. The API layer 110 can then interact with servers/guilds service 124 to create the server by providing the server with a unique identifier and associating various configurations requested by the user account. Once the server is created, the user account that created the server can be considered the owner and/or admin for the server. The servers/guilds service 124 can record the information about the server using data service 112 to store information about the server in database 114.

In some embodiments, servers can be configured to be public or private. A public server is one that any user can search for and request to join. A private server is one that a user needs to be invited to join. Depending on the configuration of the private server, a user can be invited by another user or may need to be invited by the administrator of the private server. Users can request to join a public or private server, and an entity with administrative privileges can grant the request.

In some embodiments, servers can be managed by the user account that created the server. Additionally, server administrators can delegate privileges to other user accounts to be administrators, and administrators can also create or invite bots 106, such as a chatbot, to perform some administrative actions.

In addition to approving user accounts to join a server, administrators can also set up various safety or content moderation policies. In some embodiments, those policies are enforced by user accounts with the administrator role for the server. In some embodiments, the policies can be enforced by software services provided by the community hosting service 102, such as the Safety/moderation service 116 or bot 106.

As introduced above, servers are environments for supporting a community and are generally created around topics. In furtherance of that function, servers can be configured to integrate content through embedded channels or webhooks. For example, an administrator of a server might integrate a YOUTUBE channel, a TWITCH feed, or a TWITTER feed into one or more channels of the server when the content of those channels or feeds are relevant to the channel. In some embodiments, a server can follow a channel offered by another server supported by the community hosting service 102.

In addition to hosts, user accounts that are members of a server can also use their instance of client application 104 to interact with the community hosting service 102. The client application 104 can make requests of the community hosting service 102 to initiate a session with the community hosting service 102 and to access servers and channels to which the user account is a member, receive notifications and send messages, and otherwise communicate in the channels in which they belong.

As illustrated in FIG. 1, community hosting service 102 provides a variety of services that can be called by client application 104 or other services of the community hosting service 102.

For example, the community hosting service 102 includes a servers/guilds service 124. The servers/guilds service 124, as described above, can be used to create and administer a server. Additionally, the servers/guilds service 124 can also support various functions to those user accounts that are members of a server. For example, when an instance of client application 104 establishes a session using sessions service 120, the sessions service 120 can interact with servers/guilds service 124 to provide information regarding the servers to which the user account belongs. The client application 104 can receive identifiers of all servers to which the user account operating the client device associated with client application 104 is a member. While the session is active, client application 104 can request updates regarding one or more of the servers to which the user account operating client application 104 belongs from servers/guilds service 124.

Community hosting service 102 also provides a safety/moderation service 116. As with any online community, community hosting service 102 occasionally needs to deal with user accounts issuing spam or inappropriate content. While administrators of servers can perform some moderation functions such as suspending user accounts on a particular server or banning user accounts or bots for inappropriate posts or for posting spam, community hosting service 102 can have various software services that attempt to moderate some posts. For example, safety/moderation service 116 can include algorithms designed to detect hate speech or other harmful or inappropriate content. Safety/moderation service 116 can also include algorithms configured to identify communications as spam or phishing. Safety/moderation service 116 can provide various functions to protect users from content posted in a channel and attacks on client application 104 or the computing device hosting client application 104.

Community hosting service 102 can also include a data analytics service 118. The data analytics service 118 can provide various services in support of community hosting service 102 and in support of the users of community hosting service 102. For example, data analytics service 118 can monitor the performance of various features of the community hosting service 102 to determine whether updates to features are well received by the user community. The data analytics service 118 can also be used to develop and run various machine learning algorithms and other algorithms designed to identify harmful content, malicious servers, malicious user accounts, and malicious bots 106.

As introduced above, sessions service 120 is configured to authenticate a user account to community hosting service 102. After a user account has been authenticated, the sessions service 120 can determine one or more servers to which the user account is a member or for which the user account is an administrator. The sessions service 120 can send a list of identifiers for the servers associated with the user account to the client application 104. Thereafter, the client application 104 can request information regarding the servers by using a session token that validates that the client application 104 is operating in an authenticated session.

The presence service 122 can be used to provide presence information regarding other members of a server or a channel to which the user account belongs. Through the presence service 122, the client application can convey information about which user accounts are currently active in the server or channel. Likewise, the client application 104 can provide presence information for the user account controlling the instance of client application 104.

Community hosting service 102 can also include a real-time communications service 108. The real-time communications service 108 is configured to support real-time communications such as live voice communications or video conferencing. In some embodiments, the real-time communications service 108 can be a public Internet service located outside a gateway for community hosting service 102. Real-time communications service 108 can provide real-time communications for channels configured to support real-time communications.

FIG. 1 also illustrates a bot configuration service 126 for creating and/or configuring one or more bots 106. The bot configuration service 126 can provide tools and template configurations to configure bots to take on a variety or roles within a channel of a server. The bots 106 can be created and configured by users of the community hosting service 102 and linked to servers chosen by the administrator. In some embodiments, the bot 106 can be configured as a chatbot that can have some understanding of the human language through natural language processing technologies. The bot 106 can be configured to provide some content moderation functions and/or some administrative functions. For example, the bot 106 might be granted permission to invite new members, send messages in a channel, embed links, remove members, delete messages, mute members, and attach files, among other possible functions. In some embodiments, bot 106 can have their own user account and are authenticated using a token. bot 106 can have full access to all services of community hosting service 102.

While the community hosting service 102 is shown with just one of each service and database, it will be appreciated by those of ordinary skill in the art that community hosting service 102 can include many instances of each service or database, and in some embodiments, there can be different versions of the service or database that may utilize different technologies such as coding languages, database schemes, etc.

In some embodiments, the community hosting service 102 is configured such that the majority of communications between the community hosting service 102 and the client application 104 pass through API layer 110. The client application 104 can request responses from various services provided by the community hosting service 102 from the API layer 110. Additionally, services within the community hosting service 102 can communicate with each other by sending messages through the API layer 110. The client application 104 can also interact with a real-time communications service 108 for voice and video communication services. Although the community hosting service 102 is be described with respect to a particular system architecture and communication flow, it will be appreciated by those of ordinary skill in the art that other system configurations are possible.

Figure 2A:
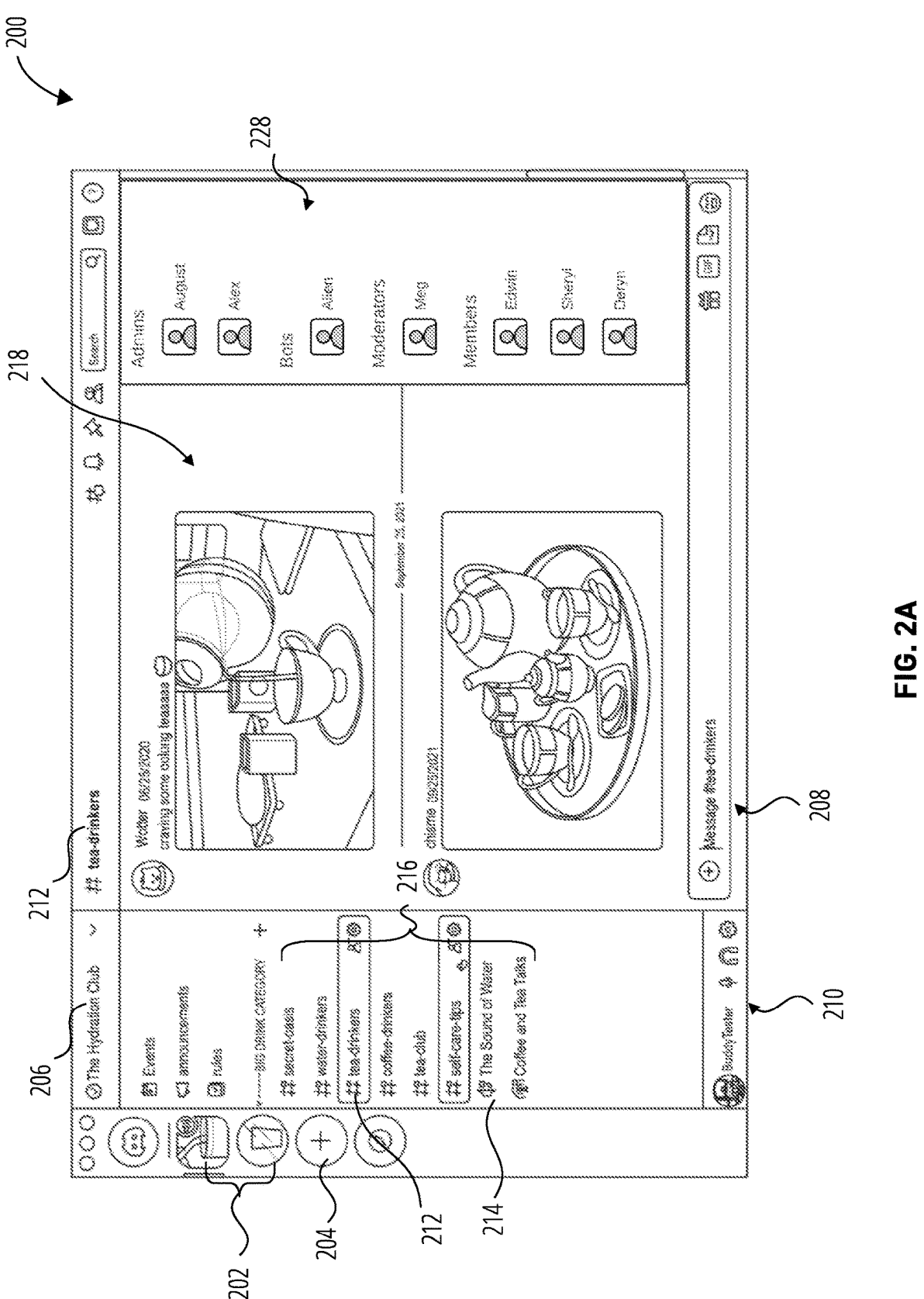
FIG. 2A illustrates an example of a user interface presented by a client application in accordance with some aspects of the present technology.

FIG. 2A illustrates an example of user interface 200 presented by client application 104.

User interface 200 includes icons for servers 202. The top icon has been selected and represents the "hydration club" server. The title 206 of the selected server, the "hydration club," is presented at the top of the user interface 200. User interface 200 also includes a plurality of channels 218 that are part of the server hydration club server. One of the channels, entitled "tea drinkers" 212 is a non-real-time messaging channel. The message thread within the "tea drinkers" 214 channel can be shown within messaging pane 220. As illustrated in FIG. 2A, the messaging pane 218 is configured to present content such as text messages, images, emojis, recorded voice or video files, attachments, etc. A user can provide content to be included in the channel using message interface 208.

User interface 200 also includes a selectable option 204 to add additional servers. User interface 200 also includes a user account icon and voice/video channel controls 210.

User interface 200 also includes a group members panel 228 that can present a roster of members belonging to the currently displayed channel (tea drinkers). As illustrated in FIG. 2A the group members panel 228 can organize the list the members of the channel by their role in the channel. For example, the group members panel 228 shows members of the channel in roles of "Admins" (administrators or owners of the channel or server), bots (e.g. Bots 106), moderators (members with permissions and authority to moderate content posted in the channel), and members (user accounts that can at least read the content of the channel and may be able to post or perform additional actions depending on the configuration of the channel). In some embodiments, the members in the members panel will only be displayed when they have an active session with the channel or with the community hosting service 102. For example the presence service 122 can cause the group members panel 228 to show which members are active in the server or channel. In some embodiments, all members of the channel can be listed in the group members panel 228 and an indication next to their avatar and user name can indicate whether they have an active session. While group members panel 228 illustrates some example roles such as admins, bots, moderators, and members, such roles should not be considered limiting; more or less roles may exist for a channel or server.

Figure 2B:
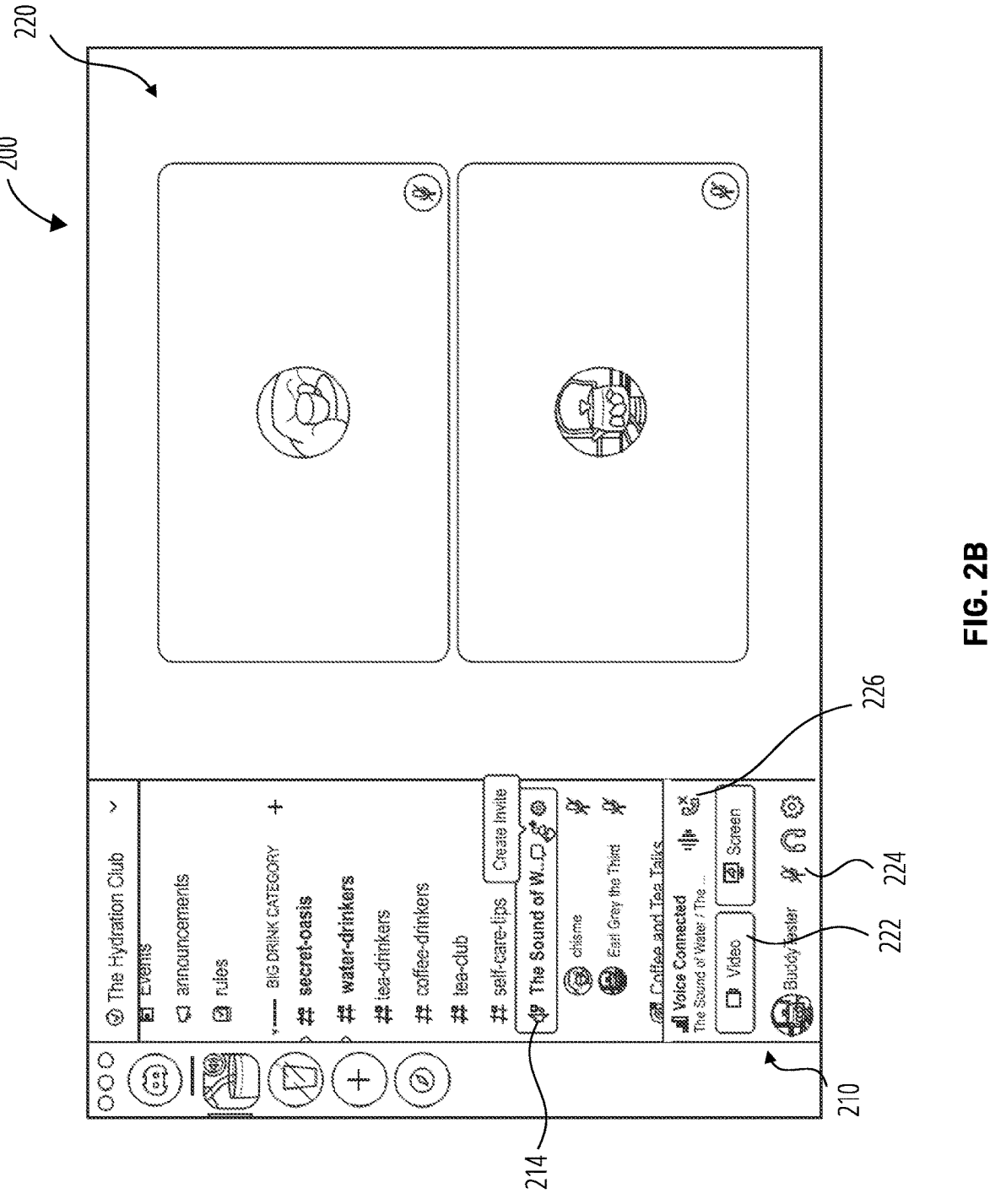
FIG. 2B illustrates an example of a user interface presented by a client application in accordance with some aspects of the present technology.

FIG. 2B illustrates an example of user interface 200 presented by client application 104. In FIG. 2B channel 214 for the channel entitled "sound of water" has been selected. The "sound of water" channel is a real-time communications channel. Accordingly, messaging pane 220 shows two user accounts engaged in real-time communications. As illustrated in FIG. 2B, the user account icon and voice/video channel controls 210 show that the user accounts microphone 224 is muted. Additionally, the user account has options 222 to share their video or screen. The user account can also disconnect from the real-time communications using option 226.

FIG. 3 illustrates an example method for retroactively capturing a potential clip on a client application in a rolling buffer. Although the example method depicts a particular sequence of operations, the sequence may be altered without departing from the scope of the present disclosure. For example, some of the operations depicted may be performed in parallel or in a different sequence that does not materially affect the function of the method. In other examples, different components of an example device or system that implements the method may perform functions at substantially the same time or in a specific sequence.

When user accounts participate in live audio-video sessions such as voice and/or video calls, streaming game play, or watch game play remotely, it can sometimes occur that a user desires to have a clip of the audio-video session after some event during the live audio-video session. The present technology can preserve audio and video from the audio-video session in a rolling in-memory buffer, where once full, the oldest content is discarded. Assuming the user account designates content in the rolling buffer to be saved, the present technology can persistently save the clip of the audio-video session.

According to some examples, the method includes receiving an instruction to initiate a clips capture tool. In some embodiments, the client application 104 can initiate storing video frames and at least two streams of audio (e.g., audio from the game/client application 104 and the respective call participant's voice audio streams) in a rolling buffer at block 302 after the instruction to initiate the clips capture tool is received. In other words, the present technology may need to be activated in order for the audio and video from the audio-video session to be stored in the rolling buffer.

In some embodiments, a user account initiating the clips capture tool can indicate which audio streams and video streams might be of interest. The specific options available to a user account can depend on the user account's role in the audio-video session and what audio streams and video streams are available to the client application 104. For example, if the user account is one that is streaming a video, such as a video of game play, or video of themself, the user account is a video streamer user because they are streaming video from their client application 104. If the user account is one that is streaming audio, such as audio from game play, or audio of their commentary, the user account is an audio streamer because they are streaming audio from their client application 104. If the user account is one that is receiving video or audio from other users, the user account is a participant. A user account can be any one of, or any combination of, a video streamer, an audio streamer, and a participant in the same audio-video session.

A user that is a streamer has access to whatever video or audio that they are streaming and can select one or all of these as a source. A user account that is a participant has access to any video streams or audio streams that is streamed to their client device. For example, if the user account initiating the clips capture tool is on a video call with four participants, including them, and is watching a stream of gameplay, the user account might indicate only a subset of audio and video steam that are of interest, and only the selected audio streams and video audio streams should be recorded in the rolling buffer for possible use in a clip. In some embodiments, the audio streams and video streams can be selected independently. In some embodiments, any user account for which audio or video is to be recorded might receive a notification indicating that the call is being recorded.

According to some examples, the method includes receiving an audio-video streams. The audio-video streams can include video frames and associated video frames at block 304. For example, the client application 104 illustrated in FIG. 1 may receive an audio-video streams, the audio-video streams including video frames and associated video frames.

The audio from a local streaming participant and remote participants can be stored as it is received because the audio streams from each participant are independent of one another. When only a subset of participant audio streams have been selected for recording, the non-selected audio streams will not be stored in the rolling buffer.

Likewise, the video from a local streaming participant and the remote participants can be stored as it is received because some of the video streams from each participant might be independent of one another. In some embodiments, depending on the character of the audio-video streams, remote participants might remain only participants and will not stream video back. In some embodiment, remote participants will also be video streamers themselves. In such embodiments, the local participant will have access to their own outgoing video stream and at least one incoming video stream. When only a subset of participant video streams have been selected for recording, the non-selected video streams will not be stored in the rolling buffer.

According to some examples, the method includes storing the video frames from the selected video stream(s) and the selected streams of audio in a rolling buffer at block 306. For example, the client application 104 illustrated in FIG. 1 may store the video frames and the selected audio streams in a rolling buffer. In some embodiments, rolling buffer is a first-in, first-out (FIFO) buffer.

Video frames are often reliant on previous frames back to the most recent keyframe to decode encoded video frames. This creates a complexity for a rolling buffer, where a keyframe could be discarded that is needed to decode a subsequent frame when the keyframe is the oldest frame in the rolling buffer, and it gets purged. To overcome this challenge, the present technology can utilize any of several mechanisms. The particular mechanism used can be dependent on whether the user account is streaming video, and can be dependent on the format of the video stream to be captured. For example, if the user account is streaming video they are already using a streaming video encoder so any encoding for the saving of clips will require an additional encoder, called the first encoder herein. The first encoder is a side encoder used for the purpose of maintaining the rolling buffer and creating clips from the audio-video session. Additionally, if the user is streaming video they will have access to the raw video and the video encoded for streaming, but if the user is receiving streamed video, the user will only have access to previously encoded video. Each scenario presents its own challenges.

One mechanism to manage keyframes in a rolling buffer is to utilize a mechanism to ensure that any keyframes are not discarded until all frames that reference the keyframe have aged out of the buffer. One way to accomplish this is to increase the size of the buffer beyond a stated size so that the buffer can always have a few extra video frames of cushion. This technique can be more useful if it can be ensured that the extra space in the buffer is large enough to store the keyframe and the frames that reference it.

Another mechanism to manage key frames in the rolling buffer is make use of a first encoder (e.g., a side encoder), while the system also uses a streaming video encoder to handle the streaming of the content, that can create keyframes at regular intervals. In some embodiments, the first encoder can select a keyframe interval. For example, to support efficient editing, and ensure that the rolling buffer will include any necessary keyframes, the first encoder can encode keyframes at a regular interval. For example one keyframe per second or every 2 seconds. This gives the benefit to only trim the clips based on keyframe-separated blocks. When creating a clip that starts with an existing keyframe, the encoding can be reused, thereby avoiding re-encoding the entire clip to start with a new keyframe. This can provide an additional efficiency that can compensate for the added burden of running multiple encoders.

In some embodiments, at least one of the first encoder and the streaming encoder is a hardware encoder. In some embodiments, at least one of the first encoder and the streaming encoder is a software encoder, such as an MP4 encoder, a JPEG encoder, H.264 encoder, H.265 encoder, AV1 encoder, etc. More specifically, the client application 104 can utilize up to three encoders (whether hardware or software encoders). The client device can utilize a streaming encoder to stream a first video source such as application/game video, the first encoder (e.g., a side encoder) to encode frames for storage in the rolling buffer, and an additional encoder to stream video captured by a camera on the client device.

Another mechanism to manage keyframes in a rolling buffer is to ensure that any keyframes are not discarded until all frames that reference the keyframe have aged out of the buffer. This mechanism includes, before deleting frames from the buffer, identifying an oldest keyframe in the rolling buffer and a second oldest keyframe in the rolling buffer, and deleting the oldest keyframe and the video frames between the oldest keyframe and the second oldest keyframe. In this way, all frames reliant on a keyframe can be deleted from the rolling buffer at the same time as the frames dependent on the keyframe.

To support a streaming viewer to create a clip, because the viewing client is receiving already encoded streaming video there is a further challenge in that the only keyframe in the streaming video comes at the time the user joins the stream. To compensate for this the first encoder can be used to create new keyframes at regular intervals so that the rolling buffer can contain key frames needed to capture a clip.

Another option is for the viewing user to simply request the clip from the device of the streaming user. In this scenario, the client application 104 on the viewing participant device can request the clip from the client application 104 on the streamer's device. The client application 104 on the streamer's device can store the audio and video from the rolling buffer for eventual transfer to the requesting participant's device.

Another mechanism to manage keyframes in a rolling buffer is to perform analysis on the video in the rolling buffer and make intelligent decisions about which keyframes need to be saved. The method can involve determining that the video frames and in the rolling buffer are likely to be selected for use in the clip at block 308. For example, the client application 104 illustrated in FIG. 1 may determine that the video frames and in the rolling buffer are likely to be selected for use in the clip.

According to some examples, the method includes dynamically increasing the size of the rolling buffer to avoid the deletion of portions of the rolling buffer in response to the determination that the contents of the rolling buffer are likely to be selected for the clip at block 310. For example, the client application 104 illustrated in FIG. 1 may dynamically increase the size of the rolling buffer to avoid the deletion of portions of the rolling buffer. In some embodiments, the size of the rolling buffer can be managed by adjusting a frame rate of captured video frames, or when there are multiple video streams in the audio-video streams, storing video frames from an in focus video stream, or a selected video stream, of the multiple video streams, but not other video streams of the multiple video streams. For example, the in focus video stream can be a video stream associated with a speaker, the streaming user, or a video of the game play.

As noted above, in some embodiments a first encoder is used to encode video being stored in the rolling buffer. The first encoder is used to distinguish this encoder from a streaming encoder that is used to encode the audio-video streams, as will be addressed further below. The use of a first encoder for the captured video provides additional flexibility to save the video in an arbitrary resolution and a different codec than that sent to participants in the audio-video streams, the quality of the encoding is independent of the participants on the call and it provides control of keyframe intervals as noted above. In some embodiments, the first encoder is called a side encoder; however, a more accurate description of the first encoder is an encoder that is used to encode contents going into the rolling buffer for the creation of clips.

In some embodiments, the first encoder can be initiated when the client application 104 receives an instruction to initiate a clips capture tool at block 302.

Figure 11:
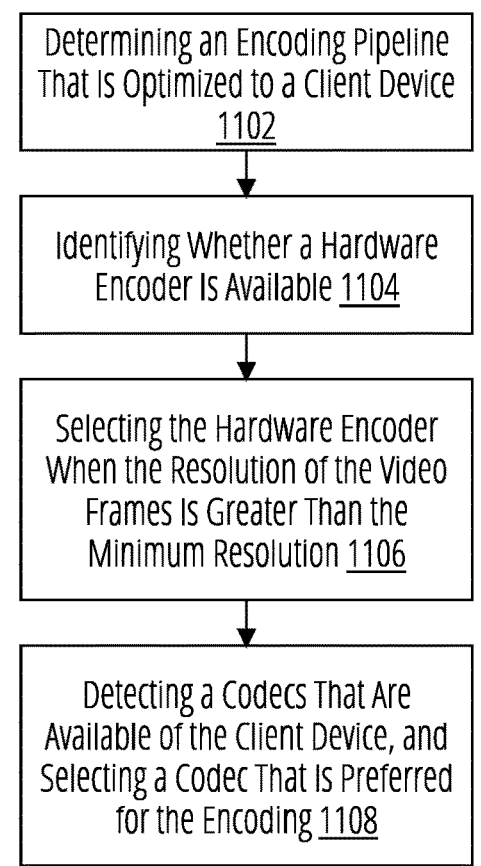
FIG. 11 illustrates an example method for detecting and utilizing an encoding pipeline that is optimized for use on the client device in accordance with some aspects of the present technology.

Running a first encoder will consume additional system resources. Therefore, it can be important to perform the encoding as efficiently as possible. FIG. 11 addresses an aspect of the present technology whereby the client application 104 can determine an efficient use of system resources for a client device running the client application 104.

According to some examples, the method includes receiving an instruction to save a clip of the audio-video streams at block 312. For example, the client application 104 illustrated in FIG. 1 may receive an instruction to save a clip of the audio-video streams. The clip consists of at least a portion of the audio-video streams that has already occurred and is stored in the rolling buffer.

In some embodiments, the instruction to save the clip is an output of a machine learning algorithm that predicts a user will want to save the clip, for example, the machine learning algorithm can predict that the user will want to save the clip based on an analysis of content of the at least two streams of audio, or an excitement attribute in voices of the call participants Accordingly, the instruction can be automatically provided by the client application 104 to result in an automatic clip capture.

In some embodiments, the instruction to save the clip is received from a third-party service integrated with the audio-video streams, for example, a gaming platform API can be integrated and can send a signal to trigger the client application on a client device to save the clip.

According to some examples, the method includes saving the at least a portion of the audio-video streams stored in the rolling buffer in a persistent memory for editing at block 314.

Although the method described in FIG. 3 addressed an embodiment wherein the client application 104 had enabled the clipping feature and was streaming while saving streamed content from a video call or an application (such as a video game) was saved in a rolling buffer, the present technology can also apply to other scenarios to enable clipping. For example, in addition to the embodiments wherein a user streams video and audio, clipping can also be enabled when a user streams an application (such as a video game) while on a voice call.

Clipping can also be enabled even when the client application 104 is not participating in streaming or watching, but is simply playing a game (or interacting with another application). In such embodiments, the client application 104 detects the game play and initializes the clip capture pipeline, so the user can do solo clipping with only game audio and video being captured. If the user joins a voice call while playing a game, then both game audio/video and call participants' audio are captured in the rolling buffer and can be saved as a clip.

Figure 4:
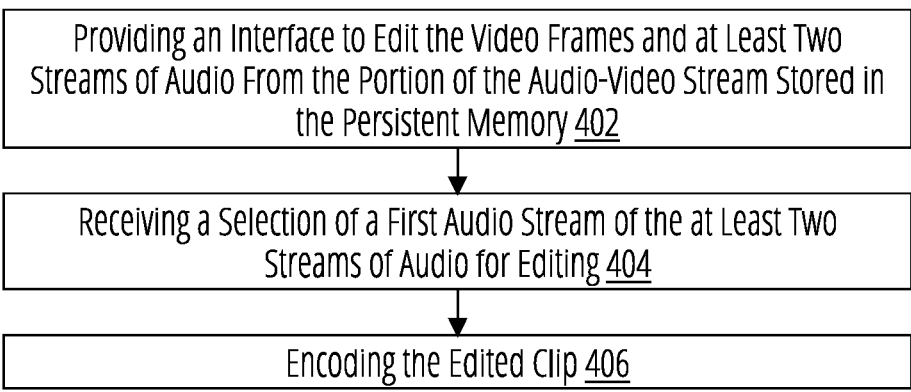
FIG. 4 illustrates an example method for editing the clip, and encoding the clip in accordance with some aspects of the present technology.

FIG. 4 illustrates an example method for editing the clip, and encoding the clip in accordance with some aspects of the present technology. Although the example method depicts a particular sequence of operations, the sequence may be altered without departing from the scope of the present disclosure. For example, some of the operations depicted may be performed in parallel or in a different sequence that does not materially affect the function of the method. In other examples, different components of an example device or system that implements the method may perform functions at substantially the same time or in a specific sequence.

The example method illustrated in FIG. 4 can be used with the example method illustrated in FIG. 3. For example, the interface to edit the video frames and audio streams addressed in FIG. 4 can work on the audio-video streams stored in the persistent memory for editing saved with respect to block 314.

According to some examples, the method includes providing an interface to edit the video frames and at least two streams of audio (e.g., audio from the game/client application 104 and the respective call participant's voice audio streams) from the portion of the audio-video streams in the saved clip stored in the persistent memory at block 402. For example, the client application 104 illustrated in FIG. 1 may provide an interface to edit the video frames and at least two streams of audio from the portion of the audio-video streams in the saved clip file. An example of the interface to edit the video frames and the streams of audio is the clip editing interface 902 illustrated in FIG. 9. The interface to edit the clip can be used to generate an edited clip.

According to some examples, the method includes receiving a selection of a first audio stream of the at least two streams of audio for editing at block 404. For example, the client application 104 illustrated in FIG. 1 may receive a selection of a first audio stream of the at least two streams of audio for editing. The clip editing interface 902 can present available audio streams for selection as audio channel selection options 906. In some embodiments, the available audio streams can be as many audio streams as exist in the audio-video streams, or if a subset of audio streams were identified when the clip recording tool was activated, as addressed with respect to block 302, the subset of audio streams can be presented as audio channel selection options 906.

The audio channel selection options 906 are associated with toggle switches to allow the audio streams to be selected or muted. In some embodiments, the audio streams can be toggled on or off for specific frames or a range of frames such that a portion of the edited clip can include audio from a first source, and a portion can include audio from the second source or both sources.

Figure 9:
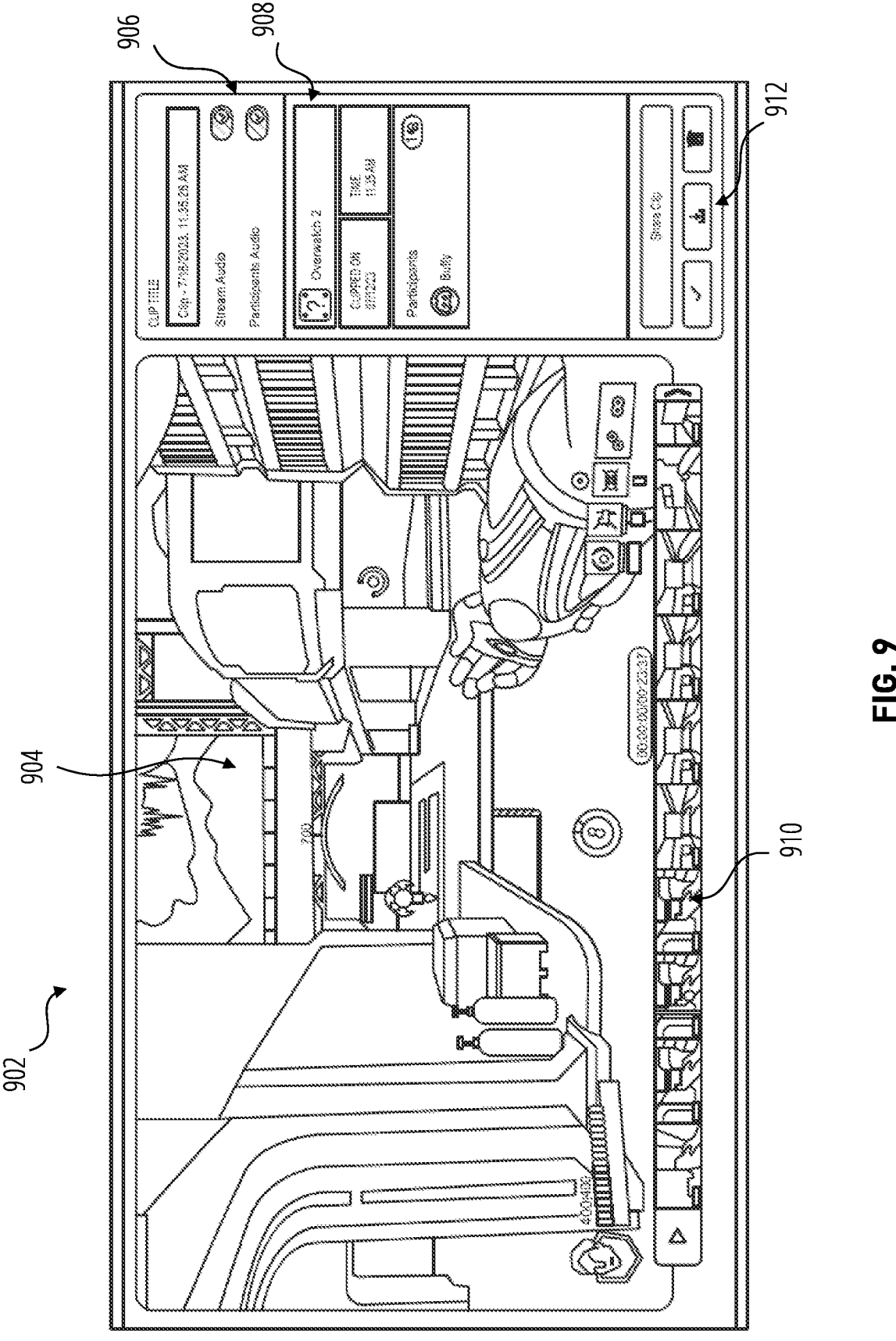
FIG. 9 illustrates an example clip editing interface in accordance with some aspects of the present technology.

In addition, although not shown in FIG. 9, it can be possible to add audio from a source other than an audio streams from the audio-video streams. For example, sound effects or sound clips can also be added. An example source of such sound clips can include SOUNDBOARD from DISCORD INC.

The respective audio streams within the at least two streams of audio can be independently edited.

In some embodiments, the clip editing interface 902 can present available video streams for selection as video stream selection options 908. In some embodiments, the available audio streams can be as many video streams as exist in the audio-video streams, or if a subset of video streams were identified when the clip recording tool was activated, as addressed with respect to block 302, the subset of video streams can be presented as 908. In the example illustrated in FIG. 9, only a full screen video stream is available, however, if other options were available they would be listed similarly to the audio stream options.

The clip editing interface 902 can also be used to edit and crop the clip. For example, clip editing interface 902 can display the selected video stream 904 to be edited, and can also provide video cropping interface 910 to allow a user to trim the selected audio and video streams as desired.

In some embodiments, during the editing, the clip editing interface 902 can be used to superimpose user interface attributes associated with the client application. For example, the client application 104 can superimpose a Discord avatar or emoji over the edited video. In some embodiments, such as when multiple audio streams are edited into the clip, the source of the audio can be highlighted. For example, if the source of the audio is from a particular speaker whose video or avatar is in the video frame, the speaker can be identified by a highlight or other indicator.

In some embodiments, the client application 104 can tag the edited clip with metadata indicating that the video is a clip to enable additional features associated with clips in the client application.

According to some examples, the method includes encoding the edited clip at block 406. The encoding can occur after the share, save, or download option is selected from share/save/download/delete options 912.

While reference is made above regarding a first encoder and a streaming encoder, the specific encoder that is used for encoding the edited clip can be dependent on what other activities the client device running the client application 104 is engaged in. For example, if the client device is streaming content then the streaming encoder will be in use and the first encoder might be needed. However, in many use cases, the editing of the clip would likely come after the audio-video stream is over, and the client device might have all of its encoding options available and the most desirable encoding option can be selected.

Figure 5:
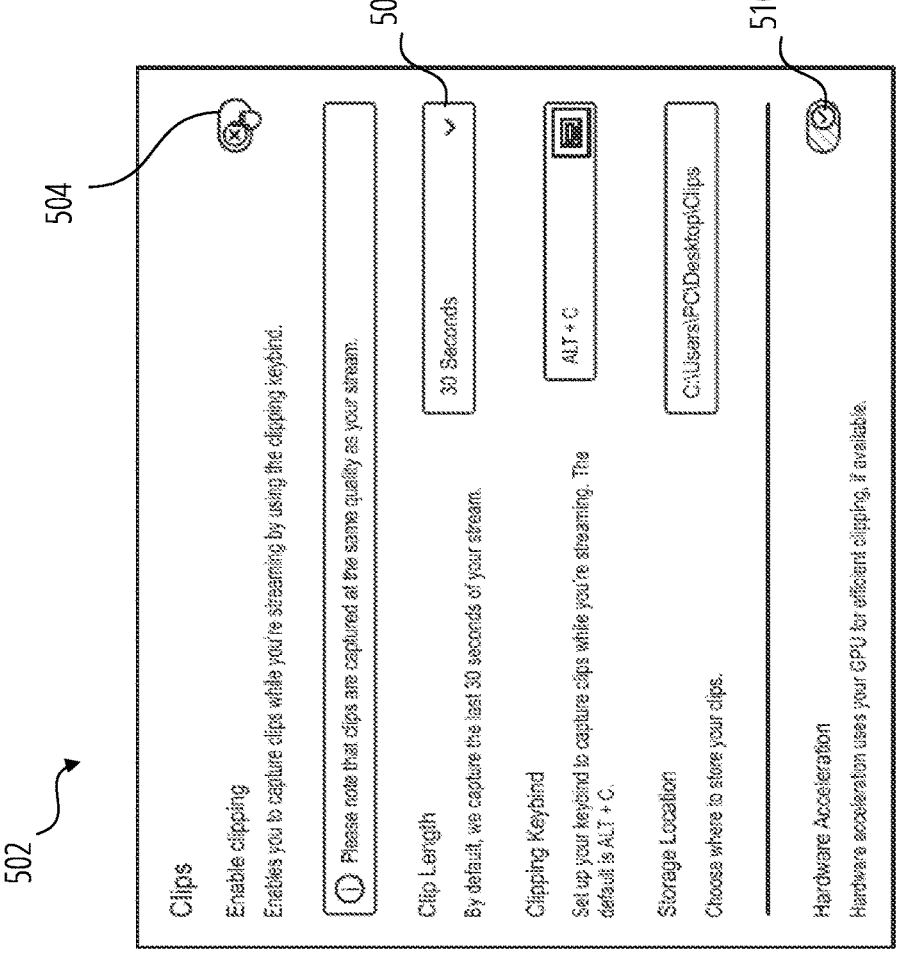
FIG. 5 illustrates an example clip settings interface in accordance with some aspects of the present technology.

FIG. 5 illustrates an example clip settings interface in accordance with some aspects of the present technology. Although the clip settings interface includes various features, these features should not be considered limiting. Other features and functions can also be present or be made available using alternative controls.

As illustrated in FIG. 5, the clip settings interface 502 provides options for enabling clips (enable clipping option 504) and configuring settings pertaining to the clips functionality. The clips functionality can be toggled on or off using enable clipping option 504.

Some configurable options pertaining to clips include clip length, shortcuts to capture a clip, storage location of captured clips and a graphics hardware option.

The clip length option 506 can allow a user to choose how much video should be stored in the rolling buffer and also coincides with a maximum clip length. While commonly selected options include 15 seconds, 30 seconds, or 1 minute, the maximum clip length option could be as long as there is space to store the clips in the rolling buffer. Longer isn't necessarily better though, as a longer clip will also require more content to edit.

The hardware graphics processing option 510 can be used to indicate whether the system should attempt to use any available graphics processing hardware, such as a graphics processing unit (GPU) for clip encoding as addressed in more detail in association with FIG. 11. In some cases, hardware graphics processing option 510 should generally be selected since it can provide more efficient graphics encoding. However, it might be desirable to turn this option off if the available GPU does not meet minimum recommended specifications, or if utilizing a system GPU results in reduced quality to the video stream to be clipped.

Figure 6:
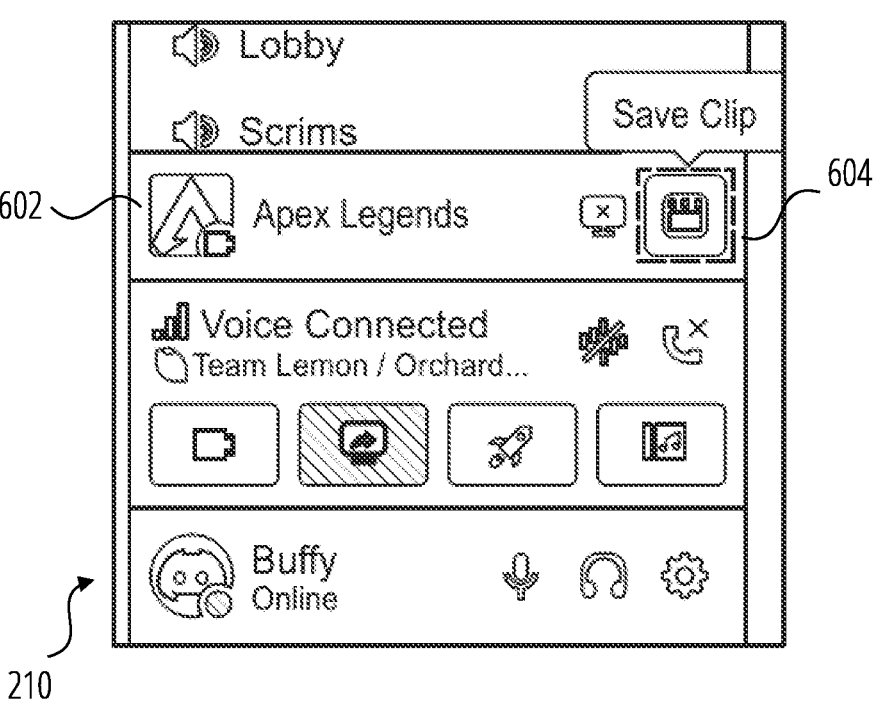
FIG. 6 illustrates an example voice/video channel controls in accordance with some aspects of the present technology.

FIG. 6 illustrates an example voice/video channel controls in accordance with some aspects of the present technology. Although the voice/video channel controls includes various features, these features should not be considered limiting. Other features and functions can also be present or be made available using alternative controls.

As illustrated in FIG. 6, the voice/video channel controls 210 from user interface 200 (illustrated in FIG. 2A) are shown. In FIG. 6 the voice/video channel controls 210 include the content/channel 602 that is the subject of an on going live stream. The voice/video channel controls 210 further include the save clip option 604, which can appear when clipping is enabled. Additionally, a user can use a shortcut key to engage the save clip option. When the user selects the save clip option 604, the present technology can save the contents of the rolling buffer as a clip for later editing and/or sharing.

Figure 7:
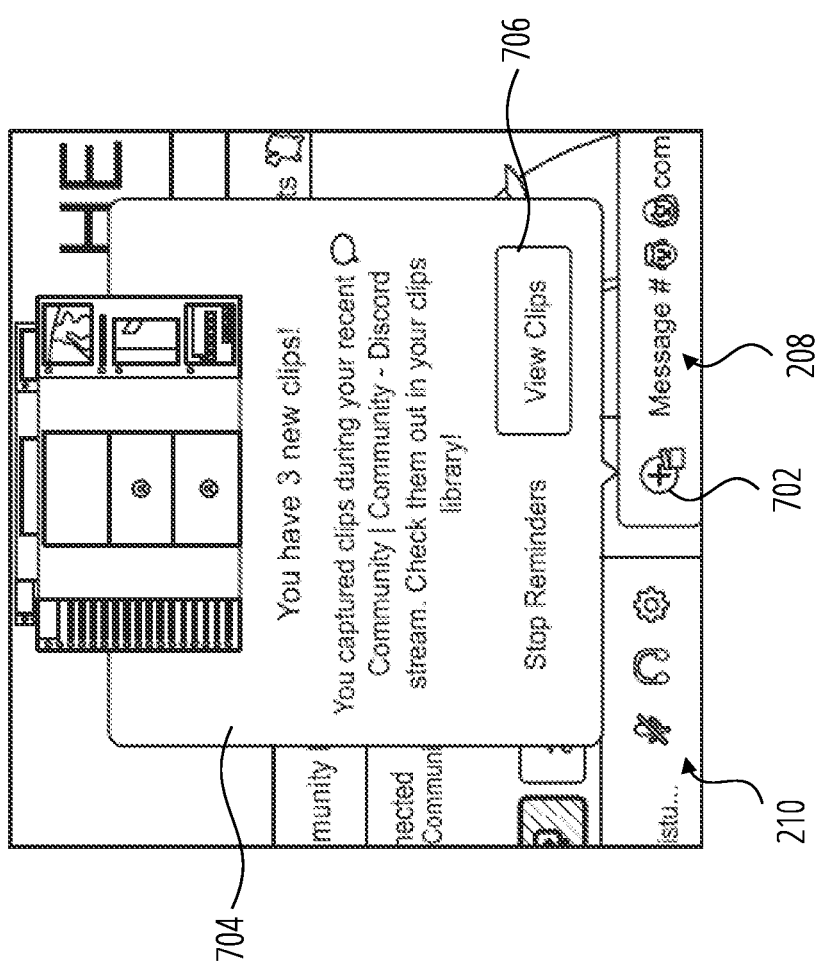
FIG. 7 illustrates an example clips reminder interface in accordance with some aspects of the present technology.

FIG. 7 illustrates an example clips reminder interface in accordance with some aspects of the present technology. Although the clips reminder interface includes various features, these features should not be considered limiting. Other features and functions can also be present or be made available using alternative controls.

As illustrated in FIG. 7, the message interface 208 from user interface 200 (illustrated in FIG. 2A) is shown. In FIG. 6 the message interface 208 includes an add content option 702 that can be used to add content into the messaging thread. For example, a user can select the add content option 702 to upload a file, create a thread, link to an app, or share a clip.

Figure 8:
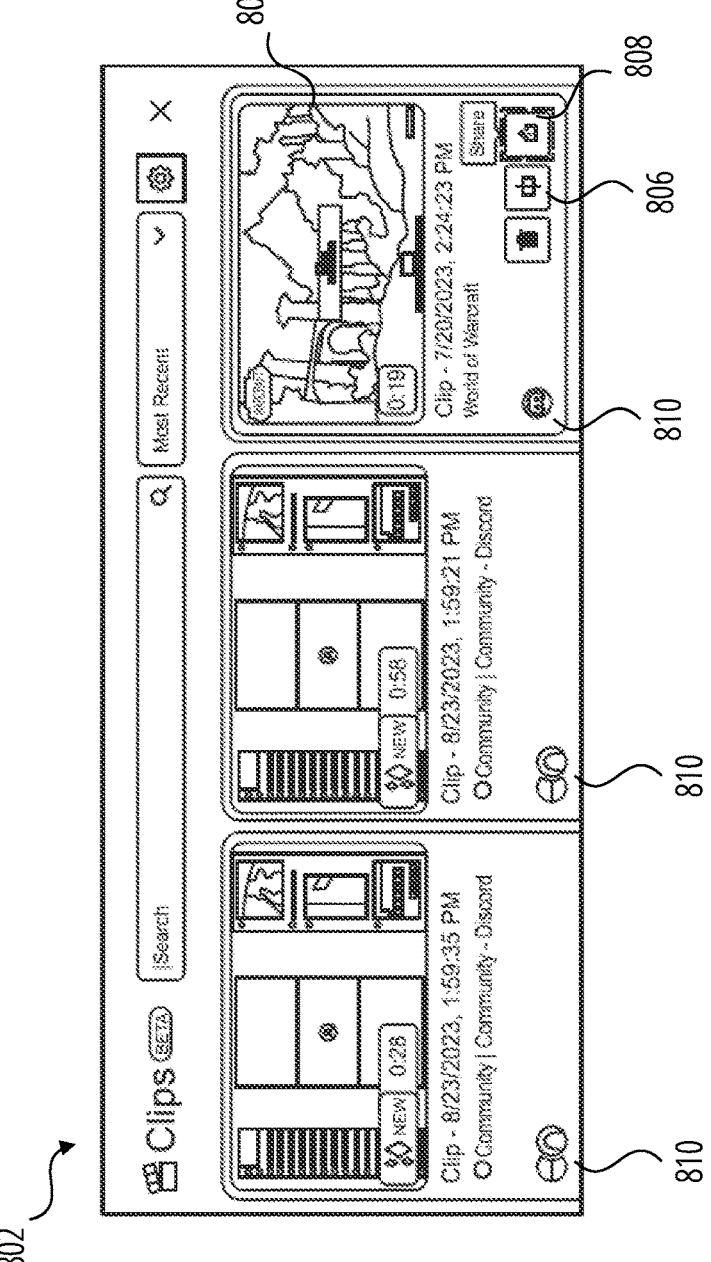
FIG. 8 illustrates an example clips gallery in accordance with some aspects of the present technology.

FIG. 7 further illustrates a clips reminder notification 704. This notification can be presented at a time after a clip has been captured, but the clip has not been edit or shared. Accordingly, the clips reminder notification 704 is presented to remind the user that they have captured a clip. The clips reminder notification 704 can be illustrated with a view clips option 706 that, when selected, can take the user directly to a gallery of saved clips (such as illustrated in FIG. 8). The clips reminder notification 704 can also point to the add content option 702 to show the user where they can find their clips when the clips reminder notification 704 isn't present.

FIG. 8 illustrates an example clips gallery in accordance with some aspects of the present technology. Although the clips gallery includes various features, these features should not be considered limiting. Other features and functions can also be present or be made available using alternative controls.

As illustrated in FIG. 8, a clips gallery 802 includes a collection of saved clips including a selected clip 804. Each clip in the clips gallery 802 can include information about the clip such as the channel or game that was live streamed and captured in the clip, and a title or the clip. In some embodiments, the system can give the clip a default name such as [clip]+[time stamp]. Each clip can also display icons representing user accounts in the livestream 810 that was the source of the clip.

Figure 10:
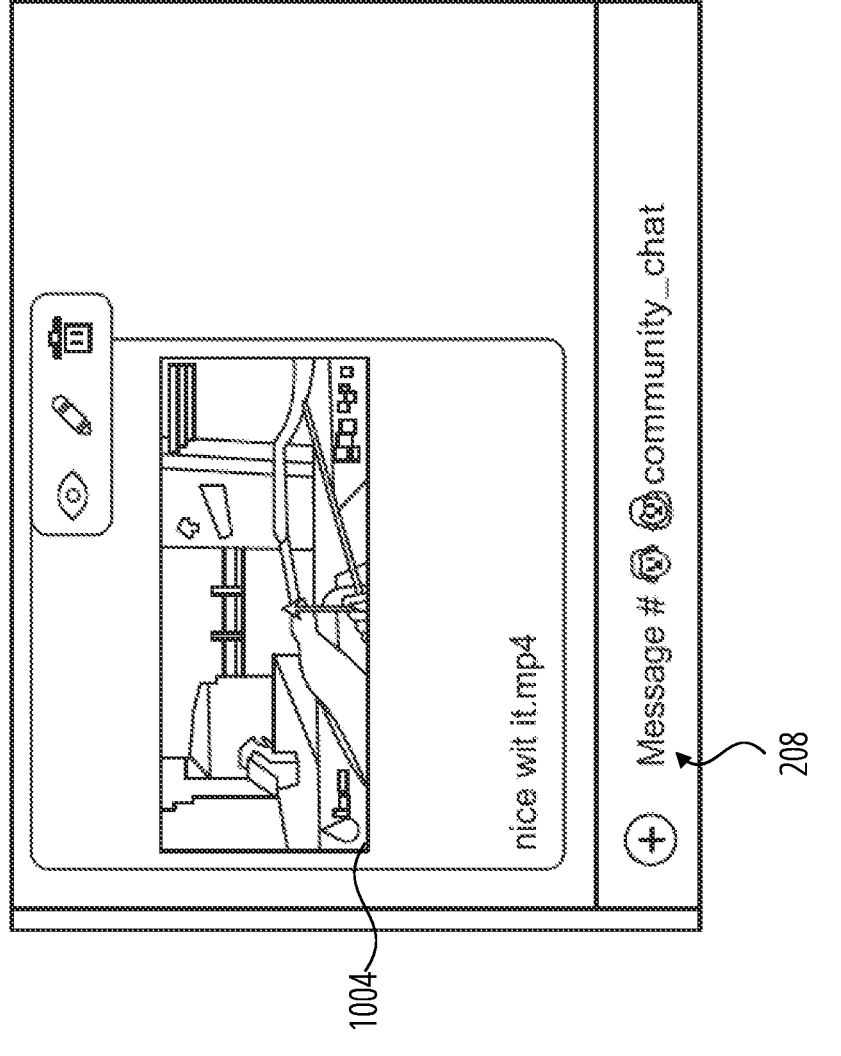
FIG. 10 illustrates a clip that has been shared in the messaging interface in accordance with some aspects of the present technology.

The selected clip 804 can present additional options such as an edit option 806 and a share option 808. FIG. 9 illustrates a clip editing interface that can be presented as a result of selecting the edit option 806 and FIG. 10 illustrates clip that has been shared in the messaging interface that can be presented as a result of selecting the share option 808.

FIG. 9 illustrates an example clip editing interface in accordance with some aspects of the present technology. Although the clip editing interface includes various features, these features should not be considered limiting. Other features and functions can also be present or be made available using alternative controls.

As illustrated in FIG. 9, the clip editing interface 902 illustrates a selected video stream 904 to be edited and saved as a clip. The clip editing interface 902 also illustrates audio channel selection options 906 which can be used to select one or more audio channels to be presented in the edited clip. The clip editing interface 902 also illustrates video stream selection options 908 which displays available video streams, when more than one video stream is available.

The selected video stream can be cropped using video cropping interface 910, and the final edited clip can ultimately be shared, saved, downloaded or deleted using 912. In some embodiments, the selection of any of the share, save, or download options can cause the edited clip to first be encoded.

FIG. 10 illustrates a clip that has been shared in the messaging interface in accordance with some aspects of the present technology. Although the FIG. 10 includes various features, these features should not be considered limiting. Other features and functions can also be present or be made available using alternative controls.

FIG. 10 illustrates a clip 1004 that has been shared in the messaging message interface 208 (illustrated in FIG. 2A). The clip can be posted and shared in the messaging interface directly from the clips gallery 802 or from the clip editing interface 902 or directly from a save file on the client device.

FIG. 11 illustrates an example method for detecting and utilizing an encoding pipeline that is optimized for use on the client device in accordance with some aspects of the present technology. Although the example method depicts a particular sequence of operations, the sequence may be altered without departing from the scope of the present disclosure. For example, some of the operations depicted may be performed in parallel or in a different sequence that does not materially affect the function of the method. In other examples, different components of an example device or system that implements the method may perform functions at substantially the same time or in a specific sequence.

According to some examples, the method includes determining an encoding pipeline that is optimized to a client device at block 1102. For example, the client application 104 illustrated in FIG. 1 may determine an encoding pipeline that is optimized to a client device.

For example, when the first encoder is instantiated it will try to acquire a hardware encoder first, and fall back on a software encoder, such as the OpenH264 encoder, if hardware encoder is not available. This scenario can be a likely scenario with the client application 104 is being used to stream video since it might be assumed that the client application 104 might be using the available hardware encoder for this task. However, when a suitable hardware encoder is available, it can used as the first encoder.

This ensures users will always be able to save clip even when their hardware encoders are fully utilized or their computers do not have a GPU for hardware accelerated encoding. Because OpenH264 software encoder is usually less efficient than HW accelerated encoder, the present technology can enforce a cap of 1080p at 30 fps for the clips encoding quality.

According to some examples, the method includes identifying whether a hardware encoder is available at block 1104. For example, the client application 104 illustrated in FIG. 1 may identify whether a hardware encoder is available. The client application detects a type of hardware encoder, e.g., Nvidia, Intel, AMD, and optimizes the encoding for the hardware encoder using GPU hardware acceleration instead of a CPU.

In some embodiments, a software encoder might be used even if a hardware encoder is available. For example, the method can determine whether the available hardware encoder meets minimum requirements. Based on testing certain models of GPUs can be considered the minimum performing model of GPU such that the following models or more advanced models are generally expected to be acceptable: NIVDIA GTX 980s/1600s, NIVDIA RTX, AMD Radeon RX 500, APPLE MacBook 2017 (especially those with the M1/M2 chipsets). In some embodiments, when a GPU does not meet these minimum requirements, a warning can be displayed to the user alerting the user that the clips function might not perform well. Additionally, if enough system resourced exist, it can be possible to run multiple software encoders.

According to some examples, the method includes selecting the hardware encoder when the resolution of the video frames is greater than the minimum resolution at block 1106.

According to some examples, the method includes detecting software codecs that are available to the client device, and selecting a codec that is preferred for the encoding at block 1108.

Figure 12:
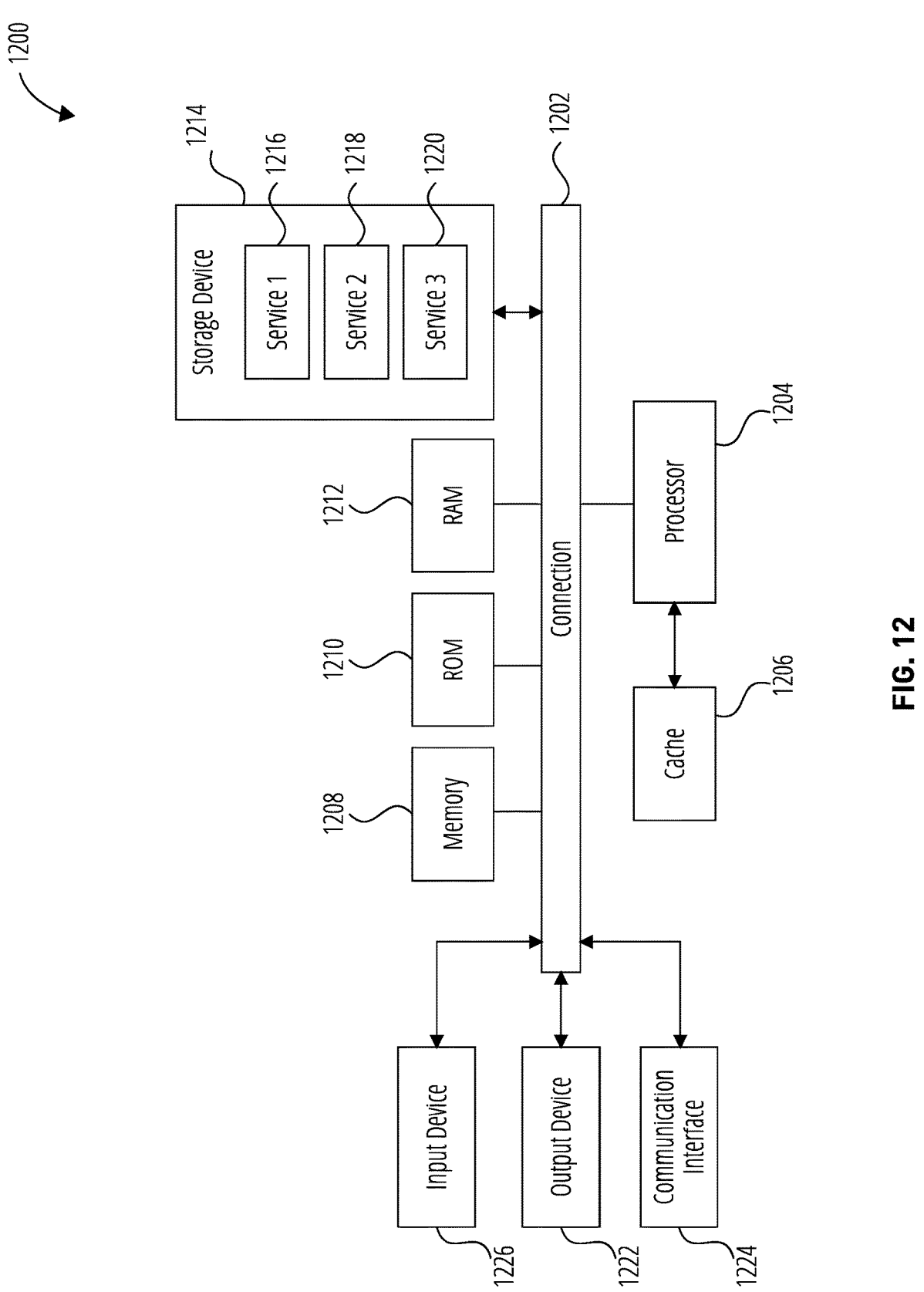
FIG. 12 shows an example of a system for implementing some aspects of the present technology.

FIG. 12 shows an example of computing system 1200, which can be for example any computing device making up client application 104, community hosting service 102, or any component thereof in which the components of the system are in communication with each other using connection 1202. Connection 1202 can be a physical connection via a bus, or a direct connection into processor 1204, such as in a chipset architecture. Connection 1202 can also be a virtual connection, networked connection, or logical connection.

In some embodiments, computing system 1200 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example computing system 1200 includes at least one processing unit (CPU or processor) 1204 and connection 1202 that couples various system components including system memory 1208, such as read-only memory (ROM) 1210 and random access memory (RAM) 1212 to processor 1204. Computing system 1200 can include a cache of high-speed memory 1206 connected directly with, in close proximity to, or integrated as part of processor 1204.

Processor 1204 can include any general purpose processor and a hardware service or software service, such as services 1216, 1218, and 1220 stored in storage device 1214, configured to control processor 1204 as well as a special-purpose processor where software instructions are incorporated into the actual processor design. Processor 1204 may essentially be a completely self-contained computing system, containing multiple cores or processors, a bus, memory controller, cache, etc. A multi-core processor may be symmetric or asymmetric.

To enable user interaction, computing system 1200 includes an input device 1226, which can represent any number of input mechanisms, such as a microphone for speech, a touch-sensitive screen for gesture or graphical input, keyboard, mouse, motion input, speech, etc. Computing system 1200 can also include output device 1222, which can be one or more of a number of output mechanisms known to those of skill in the art. In some instances, multimodal systems can enable a user to provide multiple types of input/output to communicate with computing system 1200. Computing system 1200 can include communication interface 1224, which can generally govern and manage the user input and system output. There is no restriction on operating on any particular hardware arrangement, and therefore the basic features here may easily be substituted for improved hardware or firmware arrangements as they are developed.

Storage device 1214 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 1214 can include software services, servers, services, etc., that when the code that defines such software is executed by the processor 1204, it causes the system to perform a function. In some embodiments, a hardware service that performs a particular function can include the software component stored in a computer-readable medium in connection with the necessary hardware components, such as processor 1204, connection 1202, output device 1222, etc., to carry out the function.

For clarity of explanation, in some instances, the present technology may be presented as including individual functional blocks including functional blocks comprising devices, device components, steps or methods in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The present technology includes computer-readable storage mediums for storing instructions, and systems for executing any one of the methods embodied in the instructions addressed in the aspects of the present technology presented below:

Aspect 1. A method comprising: receiving an audio-video streams, the audio-video streams including video frames and at least two streams of audio associated with the video frames; storing the video frames and the at least two streams of audio in a rolling buffer, wherein the rolling buffer is a first-in, first-out (FIFO) buffer; receiving an instruction to save a clip of the audio-video streams, the clip to consist of at least a portion of the audio-video streams that has already occurred and is stored in the rolling buffer; saving the at least the portion of the audio-video streams stored in the rolling buffer in a persistent memory for editing; and providing an interface to edit the video frames and the at least two streams of audio from the portion of the audio-video streams stored in the persistent memory, wherein the interface to edit provides an edited clip.

Aspect 2. The method of Aspect 1, further comprising: receiving a selection of a first audio stream of the at least two streams of audio for editing, wherein respective audio streams within the at least two streams of audio can be independently edited.

Aspect 3. The method of any of Aspects 1 to 2, during the editing, for example, superimposing a Discord avatar, emoji, or speaker label over the edited video.

Aspect 4. The method of any of Aspects 1 to 3, further comprising: tagging the edited clip with metadata indicating to enable additional features associated with clips in a client application.

Aspect 5. The method of any of Aspects 1 to 4, wherein the video frames stored in the rolling buffer are raw video frames, the method further comprising: encoding the edited clip.

Aspect 6. The method of any of Aspects 1 to 5, wherein the audio-video streams including the video frames includes at least two video streams including respective video frames.

Aspect 7. The method of any of Aspects 1 to 6, wherein the storing the video frames in the rolling buffer further comprises: encoding the video frames using a first encoder, wherein the first encoder dynamically selects a keyframe interval.

Aspect 8. The method of any of Aspects 1 to 7, further comprising: deleting a portion of the video frames from the rolling buffer by identifying an oldest keyframe in the rolling buffer and a second older keyframe in the rolling buffer, and deleting the oldest keyframe and the video frames between the oldest keyframe and the second oldest keyframe.

Aspect 9. The method of any of Aspects 1 to 8, wherein the audio-video streams including the video frames includes at least two video streams including respective video frames, and the first encoder encodes a first video stream of the at least two video streams at a first resolution, and encodes a second video stream of the at least two video streams at a second resolution.

Aspect 10. The method of any of Aspects 1 to 9, wherein the audio-video streams including the video frames includes at least two video streams including respective video frames, and the first encoder encodes a first video stream of the at least two video streams using a first codec, and encodes a second video stream of the at least two video streams using a second codec.

Aspect 11. The method of any of Aspects 1 to 10, further comprising: receiving an instruction to initiate a clips capture tool prior to the storing the video frames and the at least two streams of audio in the rolling buffer.

Aspect 12. The method of any of Aspects 1 to 11, further comprising: encoding the video frames using a first encoder, wherein the first encoder is a software encoder, and every frame is encoded as a keyframe.

Aspect 13. The method of any of Aspects 1 to 12, wherein the first encoder is a JPEG encoder.

Aspect 14. The method of any of Aspects 1 to 13, further comprising: determining that the video frames and the at least two streams of audio in the rolling buffer are likely to be selected for use in the clip; dynamically increasing a size of the rolling buffer to avoid deletion of portions of the rolling buffer.

Aspect 15. The method of any of Aspects 1 to 14, further comprising managing a size of the rolling buffer by adjusting a frame rate of captured video frames, or when there are multiple video streams in the audio-video streams, of the multiple video streams, but not other video streams of the multiple video streams.

Aspect 16. The method of any of Aspects 1 to 15, wherein the in focus video stream is a video stream associated with a speaker.

Aspect 17. The method of any of Aspects 1 to 16, wherein the instruction to save the clip is an output of a machine learning algorithm that predicts a user will want to save the clip, for example, the machine learning algorithm can predict that the user will want to save the clip based on an analysis of content of the at least two streams of audio, or an excitement attribute in voices of in the at least two streams of audio.

Aspect 18. The method of any of Aspects 1 to 17, wherein the instruction to save the clip is received from a third-party service integrated with the audio-video streams, for example, a gaming platform can be a participant in the audio-video streams and can send a signal to a client application on a client device to save the clip.

Aspect 19. The method of any of Aspects 1 to 18, further comprising: where the encoding the video frames includes: determining an encoding pipeline that is optimized to a client device in which a client application is executing, the determining comprising: identifying whether a hardware encoder is available; selecting the hardware encoder when a resolution of the video frames is greater than a minimum resolution.

Aspect 20. The method of any of Aspects 1 to 19, wherein the client application detects a type of hardware encoder, e.g., Nvidia, Intel, AMD, and optimizes the encoding for the hardware encoder using GPU hardware acceleration instead of a CPU.

Aspect 21. The method of any of Aspects 1 to 20, wherein the client application detects a codecs that are available of the client device, and selects a codec that is preferred for the encoding.

What is claimed is:

1. A method comprising:
receiving audio-video streams in a live audio-video session, the audio-video streams including video frames and at least two streams of audio associated with the video frames;
storing the video frames and the at least two streams of audio in a rolling buffer that overwrites older data as new data is received;
receiving an instruction to save a clip of the audio-video streams, the clip to consist of at least a portion of the audio-video streams that has already occurred and is stored in the rolling buffer;
while continuing to receive audio-video streams in the live audio-video session,
retroactively saving the at least the portion of the audio-video streams stored in the rolling buffer in a persistent memory for editing, whereby the at least the portion of the audio-video streams is saved after it has already been presented; and
providing an graphical user interface to edit the video frames and the at least two streams of audio from the portion of the audio-video streams stored in the persistent memory, wherein the graphical user interface to edit provides an edited clip.

2. The method of claim 1, further comprising:
receiving a selection of a first audio stream of the at least two streams of audio for editing, wherein respective audio streams within the at least two streams of audio can be independently edited.

3. The method of claim 2, during the editing, superimposing user interface attributes associated with a client application over the edited video.

4. The method of claim 1, wherein the storing the video frames in the rolling buffer further comprises:
encoding the video frames using a first encoder, wherein the first encoder dynamically selects a keyframe interval.

5. The method of claim 4, further comprising:
deleting a portion of the video frames from the rolling buffer by identifying an oldest keyframe in the rolling buffer and a second older keyframe in the rolling buffer, and deleting the oldest keyframe and the video frames between the oldest keyframe and the second oldest keyframe.

6. The method of claim 1, further comprising:
receiving an instruction to initiate a clips capture tool prior to the storing the video frames and the at least two streams of audio in the rolling buffer.

7. The method of claim 1, further comprising:
determining that the video frames and the at least two streams of audio in the rolling buffer are likely to be selected for use in the clip;
dynamically increasing a size of the rolling buffer to avoid deletion of portions of the rolling buffer.

8. The method of claim 1, further comprising managing a size of the rolling buffer by adjusting a frame rate of captured video frames, or when there are multiple video streams in the audio-video streams, storing video frames from an in focus video stream, or a selected video stream, of the multiple video streams, but not other video streams of the multiple video streams.

9. The method of claim 1, further comprising:
encoding the video frames, where the encoding the video frames includes:
determining an encoding pipeline that is optimized to a client device in which a client application is executing, the determining comprising:
identifying whether a hardware encoder is available;
selecting the hardware encoder when the hardware encoder is available.

10. A computing apparatus comprising:
a processor; and
a memory storing instructions that, when executed by the processor, configure the apparatus to:
receive audio-video streams in a live audio-video session, the audio-video streams including video frames and at least two streams of audio associated with the video frames;
store the video frames and the at least two streams of audio in a rolling buffer;
receive an instruction to save a clip of the audio-video streams, the clip to consist of at least a portion of the audio-video streams that has already occurred and is stored in the rolling buffer;
while continuing to receive audio-video streams in the live audio-video session,
retroactively save the at least the portion of the audio-video streams stored in the rolling buffer in a persistent memory for editing, whereby the at least the portion of the audio-video streams is saved after it has already been presented; and
provide ana graphical user interface to edit the video frames and the at least two streams of audio from the portion of the audio-video streams stored in the persistent memory, wherein the graphical user interface to edit provides an edited clip.

11. The computing apparatus of claim 10, wherein the instructions further configure the apparatus to:
receive a selection of a first audio stream of the at least two streams of audio for editing, wherein respective audio streams within the at least two streams of audio can be independently edited.

12. The computing apparatus of claim 10, wherein the storing the video frames in the rolling buffer further comprises:
encode the video frames using a first encoder, wherein the first encoder dynamically selects a keyframe interval.

13. The computing apparatus of claim 10, wherein the instructions further configure the apparatus to:
determine that the video frames and the at least two streams of audio in the rolling buffer are likely to be selected for use in the clip;
dynamically increase a size of the rolling buffer to avoid deletion of portions of the rolling buffer.

14. The computing apparatus of claim 10, wherein the instructions further configure the apparatus to manage a size of the rolling buffer by adjusting a frame rate of captured video frames, or when there are multiple video streams in the audio-video streams, storing video frames from an in focus video stream, or a selected video stream, of the multiple video streams, but not other video streams of the multiple video streams.

15. The computing apparatus of claim 10, wherein the instructions further configure the apparatus to:
encode the video frames, where the encoding the video frames includes:
determine an encoding pipeline that is optimized to a client device in which a client application is executing, the determining comprising:
identify whether a hardware encoder is available;
select the hardware encoder when the hardware encoder is available.

16. A non-transitory computer-readable storage medium, the computer-readable storage medium including instructions that when executed by a computer, cause the computer to:
receive audio-video streams in a live audio-video session, the audio-video streams including video frames and at least two streams of audio associated with the video frames;
store the video frames and the at least two streams of audio in a rolling buffer;
receive an instruction to save a clip of the audio-video streams, the clip to consist of at least a portion of the audio-video streams that has already occurred and is stored in the rolling buffer;
while continuing to receive audio-video streams in the live audio-video session,
retroactively save the at least the portion of the audio-video streams stored in the rolling buffer in a persistent memory for editing, whereby the at least the portion of the audio-video streams is saved after it has already been presented; and
provide ana graphical user interface to edit the video frames and the at least two streams of audio from the portion of the audio-video streams stored in the persistent memory, wherein the graphical user interface to edit provides an edited clip.

17. The computer-readable storage medium of claim 16, wherein the instructions further configure the computer to:
receive a selection of a first audio stream of the at least two streams of audio for editing, wherein respective audio streams within the at least two streams of audio can be independently edited.

18. The computer-readable storage medium of claim 16, wherein the storing the video frames in the rolling buffer further comprises:
encode the video frames using a first encoder, wherein the first encoder dynamically selects a keyframe interval.

19. The computer-readable storage medium of claim 16, wherein the instructions further configure the computer to:
determine that the video frames and the at least two streams of audio in the rolling buffer are likely to be selected for use in the clip;
dynamically increase a size of the rolling buffer to avoid deletion of portions of the rolling buffer.

20. The computer-readable storage medium of claim 16, wherein the instructions further configure the computer to:
encode the video frames, where the encoding the video frames includes:
determine an encoding pipeline that is optimized to a client device in which a client application is executing, the determining comprising:
identify whether a hardware encoder is available;
select the hardware encoder when the hardware encoder is available.

* * * * *